(12) United States Patent
Alseth et al.

(10) Patent No.: US 7,216,575 B2
(45) Date of Patent: May 15, 2007

(54) HEAVY-DUTY DEMOLITION APPARATUS WITH BLADE STABILIZING PUCK

(75) Inventors: Timothy L. Alseth, Two Harbors, MN (US); Bruce E. Bacon, Duluth, MN (US); Ross D. Christenson, Esko, MN (US)

(73) Assignee: Genesis Attachments, LLC, Cedar Rapids, IA (US)

( * ) Notice: Subject to any disclaimer, the term of this patent is extended or adjusted under 35 U.S.C. 154(b) by 119 days.

(21) Appl. No.: 10/811,539

(22) Filed: Mar. 29, 2004

(65) Prior Publication Data

US 2005/0262700 A1 Dec. 1, 2005

(51) Int. Cl.
*B26D 5/08* (2006.01)
*B02C 1/02* (2006.01)

(52) U.S. Cl. .......................... 83/609; 83/694; 30/134; 30/228

(58) Field of Classification Search ................. 83/694, 83/609; 30/134, 228; 241/101.73
See application file for complete search history.

(56) References Cited

U.S. PATENT DOCUMENTS

| | | | |
|---|---|---|---|
| 4,198,747 A | 4/1980 | LaBounty | |
| 4,382,625 A | 5/1983 | LaBounty | |
| 4,403,431 A | 9/1983 | Ramun et al. | |
| 4,450,625 A | 5/1984 | Ramun et al. | |
| 4,512,524 A | 4/1985 | Shigemizu | |
| 4,519,135 A | 5/1985 | LaBounty | |
| 4,543,719 A | 10/1985 | Pardoe | |
| 4,558,515 A | 12/1985 | LaBounty | |
| 4,669,187 A | 6/1987 | Pardoe | |
| 4,670,983 A | 6/1987 | Ramun et al. | |
| 4,686,767 A | 8/1987 | Ramun et al. | |
| 4,697,509 A | 10/1987 | LaBounty | |
| 4,771,540 A | 9/1988 | LaBounty | |

(Continued)

FOREIGN PATENT DOCUMENTS

DE 4205781 2/1993

(Continued)

OTHER PUBLICATIONS

Brochure, LaBounty Universal Processor Shear Jaws Attachment.

(Continued)

*Primary Examiner*—Boyer D. Ashley
*Assistant Examiner*—Omar Flores Sánchez
(74) *Attorney, Agent, or Firm*—Gerald E. Helget; Nelson R. Capes; Briggs and Morgan, P.A.

(57) ABSTRACT

A blade stabilizer device for a heavy-duty material handling demolition tool for shearing and crushing scrap material which includes a lower jaw connected to the boom structure of a hydraulic system of an excavator has an upper jaw pivotally connected to and closable upon the lower jaw at a pivot point. The blade stabilizing device consists of a wear guide pad supported by the lower jaw adjacent the pivot point slidably engaging the movable upper jaw to keep the upper jaw in close engagement with the lower jaw. The wear guide pad is mounted behind the pivot point. A second wear guide pad may be mounted in front of the pivot point on the opposite side of the upper jaw to cross-brace the upper jaw.

17 Claims, 7 Drawing Sheets

U.S. PATENT DOCUMENTS

| | | | |
|---|---|---|---|
| 4,776,093 | A | 10/1988 | Gross |
| 4,838,493 | A | 6/1989 | LaBounty |
| 4,881,459 | A | 11/1989 | Ramun |
| 4,897,921 | A | 2/1990 | Ramun |
| 4,951,886 | A | 8/1990 | Berto |
| 5,044,569 | A | 9/1991 | LaBounty et al. |
| 5,060,378 | A | 10/1991 | LaBounty et al. |
| 5,062,227 | A | 11/1991 | De Gier et al. |
| 5,146,683 | A | 9/1992 | Morikawa et al. |
| 5,158,126 | A | 10/1992 | Lang |
| 5,183,216 | A | 2/1993 | Wack |
| 5,187,868 | A | 2/1993 | Hall |
| 5,230,151 | A | 7/1993 | Kunzman et al. |
| 5,339,525 | A | 8/1994 | Morikawa |
| 5,359,775 | A * | 11/1994 | Morikawa et al. ............ 30/134 |
| 5,384,962 | A | 1/1995 | Pemberton |
| 5,385,311 | A | 1/1995 | Morikawa et al. |
| 5,474,242 | A | 12/1995 | Rafn |
| 5,478,019 | A | 12/1995 | Morikawa et al. |
| 5,533,682 | A | 7/1996 | de Gier et al. |
| 5,555,652 | A | 9/1996 | Ashby |
| RE35,432 | E | 1/1997 | LaBounty |
| 5,619,881 | A | 4/1997 | Morikawa et al. |
| 5,669,141 | A | 9/1997 | Morikawa et al. |
| 5,671,892 | A | 9/1997 | Morikawa et al. |
| 5,715,603 | A | 2/1998 | Dorguin |
| 5,718,271 | A | 2/1998 | Engelhoven |
| 5,738,155 | A | 4/1998 | Cochran |
| 5,860,214 | A | 1/1999 | Morikawa et al. |
| 5,873,168 | A | 2/1999 | Johnson et al. |
| 5,894,666 | A | 4/1999 | Hrusch |
| 5,926,958 | A | 7/1999 | Ramun |
| 5,975,644 | A | 11/1999 | Lang |
| 5,992,023 | A | 11/1999 | Sederberg et al. |
| 5,992,483 | A | 11/1999 | Bohnke |
| 6,047,749 | A | 4/2000 | Lamb |
| 6,061,911 | A | 5/2000 | LaBounty et al. |
| 6,119,970 | A | 9/2000 | LaBounty et al. |
| 6,202,308 | B1 | 3/2001 | Ramun |
| 6,230,770 | B1 | 5/2001 | Spaargaren |
| 6,298,560 | B1 | 10/2001 | Lee |
| 6,438,874 | B1 | 8/2002 | LaBounty et al. |
| 6,655,054 | B1 | 12/2003 | Ward |
| 2002/0011535 | A1 | 1/2002 | Cook |

FOREIGN PATENT DOCUMENTS

| | | |
|---|---|---|
| DE | 29708705 U1 | 7/1997 |
| DE | 29715490 U1 | 12/1997 |
| EP | 0353363 A | 2/1990 |
| EP | 0751260 A | 1/1997 |
| FR | 2822482 A1 | 9/2002 |
| GB | 2126938 A | 4/1984 |
| GB | 2236965 A | 4/1991 |
| JP | 01010827 A | 1/1989 |
| JP | 9195528 | 7/1997 |
| SU | 1021442 A | 6/1983 |
| WO | WO-2004/013417 A1 | 2/2004 |

OTHER PUBLICATIONS

Photographs and literautre—Teledyne Shear.
Literature Veratech Shear Attachments.
Literature, Iron Ax Shears.
Photographs, Komatsu (Oyodo) Shear.
Product Drawing ORT Oberlander Shear.

* cited by examiner

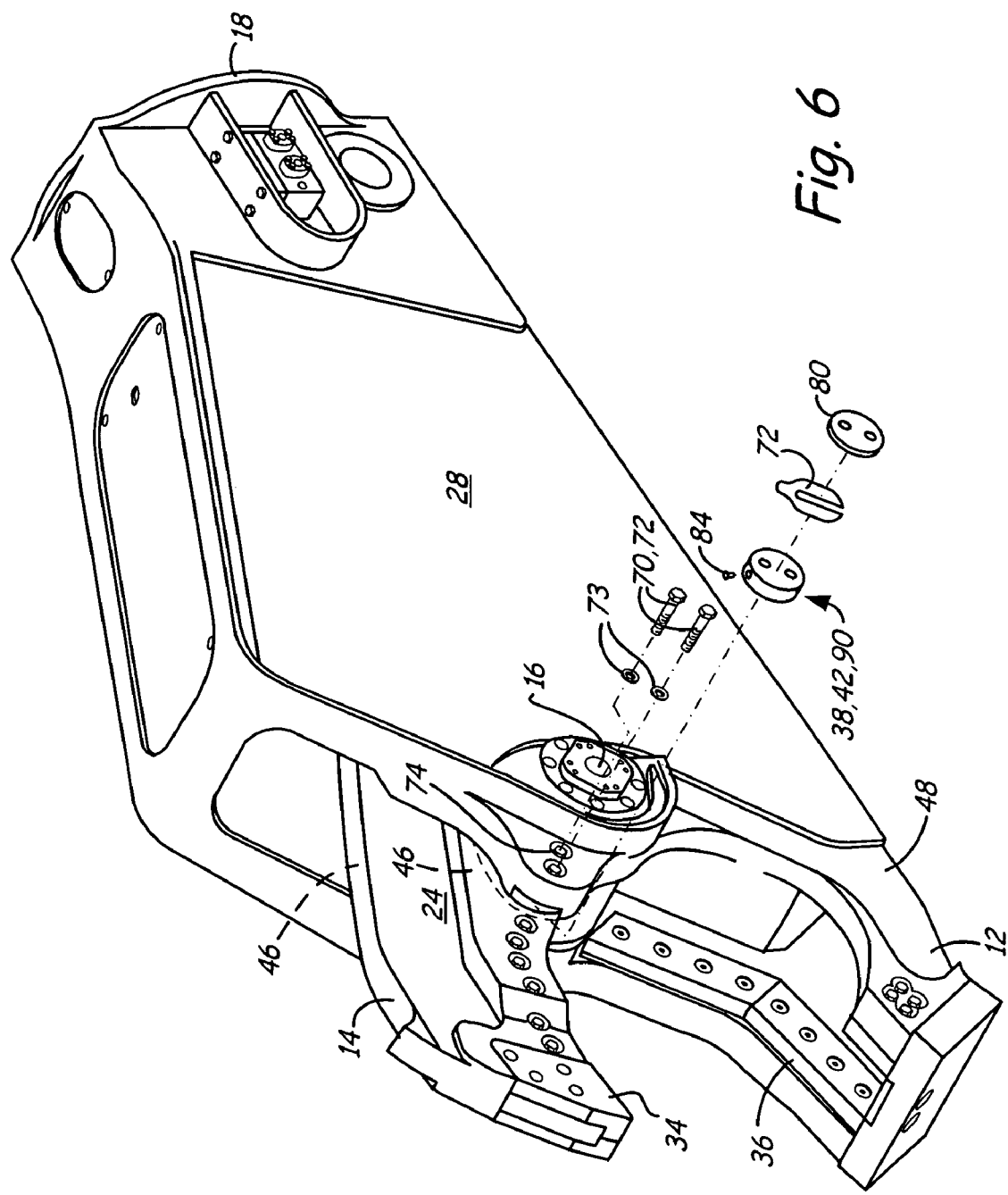

HEAVY-DUTY DEMOLITION APPARATUS WITH BLADE STABILIZING PUCK

BACKGROUND OF THE INVENTION

A fuller understanding of the operation of the demolition apparatus of the present invention may be achieved by studying U.S. Pat. Nos. 4,519,135 and 6,061,911, hereby incorporated by reference. This invention relates to a heavy duty demolition apparatus, especially adapted to be mounted on a rigid boom of a mobile vehicle and particularly adapted to be mounted on the dipper stick of an excavator, with a blade stabilizing device or puck to keep the upper jaw of the apparatus from moving laterally relative to the lower jaw and breaking during the shearing operation on a workpiece.

Heavy duty shears of the type that are powered by hydraulic cylinders are proving more and more useful in handling scrap and especially metal scrap of all sorts. Such scrap comes in many different forms, and may be in the form of pipes made of steel or soft iron or cast iron, ranging in sizes from 2 inches or smaller, and up to 8 or 10 inches in diameter or larger; structural beams such as I-beams, channels, angle beams in a large range of sizes, up to 8 or 10 inches across and larger; rods and heavy cables having diameters of 2 to 3 inches and larger, metal sheets and plates and formed metal of all sorts including wheels and automobile and truck frames, and a myriad of long and short pieces of stock and metal pieces that are cast, rolled, stamped or otherwise formed, both singly and in various types of assembly.

The prior art has included numerous shears such as that illustrated in U.S. Pat. Nos. 4,198,747; 4,188,721; 4,897,921; 4,543,719; 4,558,515 and 4,104,792. Typically, these heavy duty shears mount on the dipper stick of an excavator so that the shears may be controlled fairly well in handling various types of scrap and cutting the scrap into smaller pieces and lengths.

Typically, these shears have a fixed lower jaw and a movable upper jaw that pivots on the lower jaw, with shear blades of hardened steel on both the upper jaw and the lower jaw. The workpiece is sheared by closing the upper jaw against the lower jaw under hydraulic pressure, with the shear blades cutting the workpiece.

Unfortunately, great lateral as well as vertical pressure develops against the movable upper jaw as it contacts and proceeds to cut the workpiece. This lateral pressure can cause the upper jaw to crack or otherwise experience structural failure. This lateral pressure exists from the moment the upper jaw contacts the workpiece until the workpiece is cut and the upper jaw meets the lower jaw and becomes supported by the lower jaw in a slot in the lower jaw. This lateral force develops analogously to when a person tries to cut too heavy an object with a pair of scissors. The scissors' blades are forced laterally apart and may break.

There is a need for a heavy duty demolition shear with a blade stabilizing device that prevents lateral movement of the upper jaw relative to the lower jaw and which supports the upper jaw against this lateral pressure.

In rebuilding highways for motor vehicle travel, and in the demolition of structures which are largely made of or incorporate reinforced concrete as structural members, the disposal of large pieces of concrete paving or reinforced concrete structure becomes a significant problem. Many governmental regulations and practical considerations relating to the operation of landfills prohibit the disposal of concrete slabs and large reinforced concrete structures by simply burying them in the landfills. Accordingly, it becomes necessary to dispose of such concrete material in other ways.

Crushing of the concrete is one alternative so that the concrete slabs and structures may be reduced to smaller particle sizes which accommodates the reuse of such concrete as fill and as aggregate base for roadways and the like.

It has been possible in the past to reduce concrete into particles and chunks by use of heavy duty shears, but such shears which are primarily designed for shearing steel and other metallic and wood structures have sharpened blades and are rather expensive for the purpose of reducing concrete slabs and structures which is thought to be accomplished in other ways. Such crushers are shown in U.S. Pat. Nos. 5,478,019; 4,512,524; 5,183,216; 5,044,569; and 4,951,886.

Furthermore, crushing concrete may result in the development of lateral pressure against the movable upper jaw of a demolition shear in the same way that shearing metal does.

There is a need for a demolition apparatus with a blade stabilizing device that prevents lateral movement of the upper jaw relative to the lower jaw and which supports the upper jaw against this lateral pressure.

SUMMARY OF THE INVENTION

A blade stabilizer device for a heavy-duty material handling demolition tool for shearing and crushing scrap material which includes a lower jaw connected to the boom structure of a hydraulic system of an excavator and has an upper jaw pivotally connected and closeable upon the lower jaw beginning at the pivot point. The blade stabilizing device consists of a wear guide supported by the lower jaw adjacent the pivot point slidably engaging the upper movable jaw to keep the upper jaw in close engagement with the lower jaw. The wear guide is mounted behind the pivot point. A second wear guide may be mounted in front of the pivot point on the opposite side of the upper jaw to cross-brace the upper jaw.

An object and advantage of the invention is to provide an improved heavy-duty material handling demolition tool for shearing and crushing scrap material with a blade stabilizing device which prevents the upper jaw from moving laterally relative to the lower jaw, thus improving the cutting ability of the tool for heavy scrap material.

Another object and advantage of the present invention is to provide a blade stabilizing device for a heavy-duty demolition tool which reduces lateral stress on the upper jaw caused due to shearing the workpiece.

Another object and advantage of the present invention is that the blade stabilizing device is removable and replaceable when worn due to friction with the upper jaw.

Another object and advantage of the present invention is that the clearance between the blade stabilizing device and the upper jaw is adjustable to compensate for wear.

Another object and advantage of the present invention is that the blade stabilizing device contacts a wear surface on the upper jaw and the wear surface is dimensioned such that the blade stabilizing device does not contact the wear surface once the upper jaw is securely received in the lower jaw.

Another object and advantage of the present invention is that the blade stabilizing device may comprise a first stabilizer or puck mounted to the rear of the pivot point and a second stabilizer or puck mounted in front of the pivot point, thereby providing cross-bracing to the upper jaw.

BRIEF DESCRIPTION OF DRAWINGS

FIG. 6 is a left-side perspective view of the heavy duty demolition apparatus of the present invention.

DETAILED DESCRIPTION OF THE PREFERRED EMBODIMENT

Figure 1:
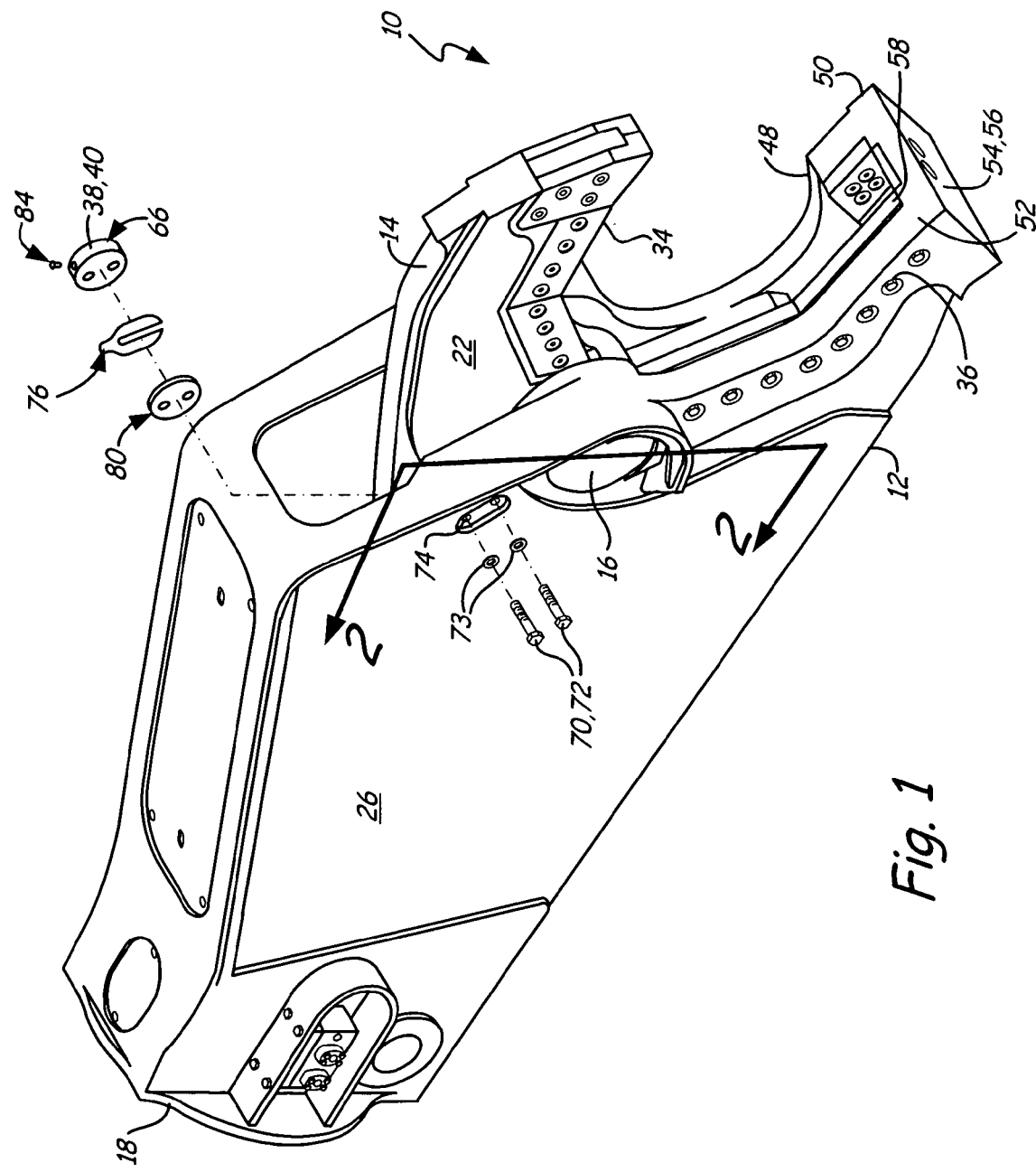
FIG. 1 is a right-side perspective view of the heavy-duty demolition apparatus of the present invention.

The heavy-duty demolition apparatus of the present invention is generally referred to in the Figures as reference numeral 10.

Referring to FIGS. 1 through 6, the heavy-duty demolition apparatus 10 comprises a lower jaw 12, an upper jaw 14, pivot means 16 interconnecting the lower jaw 12 and upper jaw 14, and means 18 for attachment to the excavator (not shown). The means 18 may further include a rotator unit 20 allowing rotation of the demolition unit 10 about a longitudinal axis. The apparatus 10 also includes means 30 for attachment to the hydraulic system of an excavator (not shown) for closing and opening the upper jaw relative to the lower jaw. More specifically, the means 30 includes a cylinder 30a having a reciprocating piston 30b within the cylinder 30a. The cylinder 30a is connected to the hydraulic system of the excavator (not shown). The piston 30b connects to the upper jaw 14 at a knuckle 32.

The upper jaw 14 has a first side 22, and a second side 24. The lower jaw 12 has a first mounting plate 26 adjacent the first side 22, and a second mounting plate 28 adjacent the second side 24. The first mounting plate 26 and second mounting plate 28 receive the pivot means 16 between them.

The upper jaw 14 has upper shear blades 34 and the lower jaw 12 has lower shear blades 36 extending along each other for shearing a workpiece when the upper shear blades 34 are closed upon the lower shear blades 36. Preferably, the shear blades 34, 36 are replaceable.

A blade stabilizing device 38 for the apparatus 10 engages the upper jaw 14 to prevent the upper jaw 14 from moving laterally with respect to the lower jaw 12 while shearing the workpiece.

Preferably, the blade stabilizing device 38 further comprises a first blade stabilizer 40 attached to the first mounting plate 26 and slidably engaging the upper jaw 14 on the first side 22 of the upper jaw 14. Optionally, a second blade stabilizer 42 may be attached to the second mounting plate 28 and slidably engaging the upper jaw 14 on the second side 24 of the upper jaw 14.

Preferably, the apparatus 10 further comprises a first arcuate wear surface 44 on the first side 22 and contacting the first blade stabilizer 40 and a second arcuate wear surface 46 on the second side 24 and contacting the second blade stabilizer 42. The second arcuate wear surface 46 may be on a hub or reinforced section of the upper jaw 14. The wear surfaces 44, 46 may preferentially be constructed of a different material from the upper jaw 14 in order to better resist sliding friction cause by the first blade stabilizer 40 and second blade stabilizer 42.

Preferably, the apparatus 10 further comprises a guide blade 48 on the lower jaw 12 lying along the lower shear blade 36 and in spaced relation therewith, the outer end 50 of the guide blade and outer end 52 of the shear blade being adjacent each other, and rigid means 54 securing the outer ends 50, 52 together. The rigid means 54 is preferably a tie plate 56.

An open slot 58 preferably exists between the lower shear blade 36 and the adjacent guide blade 48 to receive the upper shear blade 34 therein, the open slot 58 having a width wider than the thickness of the upper shear blade 34 to maintain open space between the upper shear blade 34 and the guide blade 48 when the upper shear blade 34 is in the open slot 58. Preferably, the first arcuate wear surface 44 and second arcuate wear surface 46 are of such dimensions that the first blade stabilizer or puck 40 and also perhaps the second blade stabilizer or puck 42 move off the first arcuate wear surface 44 and second arcuate wear surface 46, respectively, when the upper shear blade 34 is received in the open slot 58. This is because the first blade stabilizer 40 and second blade stabilizer 42 are no longer needed to brace the upper jaw 14 once the upper shear blade 34 is received in the slot 58.

Preferably, the first blade stabilizer 40 and second blade stabilizer 42 are removable and replaceable when they become worn due to frictional contact with the upper jaw 14. The first blade stabilizer 40 and second blade stabilizer 42 may also be adjustable to provide variable clearance between them and the upper jaw 14, as for example as the blade stabilizers become worn.

Figure 2:
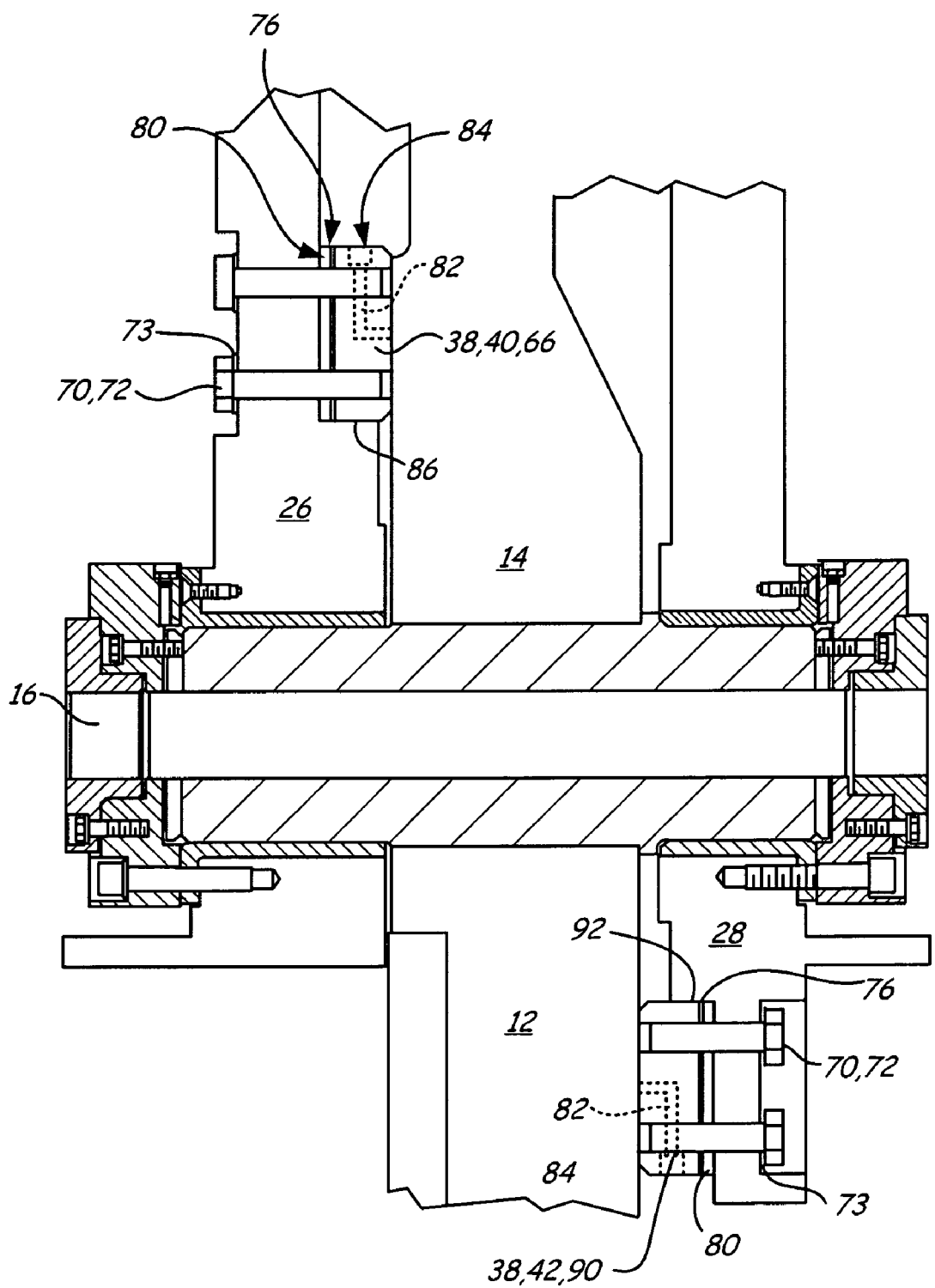
FIG. 2 is a cross-section of the heavy duty demolition apparatus of the present invention at approximately the lines 2 of FIG. 1.

In the preferred embodiment, the first blade stabilizer 40 is located rearwardly of the pivot means 16. FIGS. 1 and 2 show the details of the first blade stabilizer 40. Most preferably, the first blade stabilizer 40 comprises a first guide 66 engaging the upper jaw 14, means 70 for attaching the first guide 66 to the first mounting plate 26, and a shim 76 for adjusting the clearance between the first guide 66 and the upper jaw 14. The means 70 may most preferably be threaded bolts 72 with washers 73, but it will be recognized that any equivalent fasteners such as screws or pins could also be used. Threaded bolts 70 preferably engage the first mounting plate 26 through recessed apertures 74. The first blade stabilizer 40 may optionally further comprise an adjustment plate 80 between the first mounting plate 26 and the shim 72. The first guide 66 may preferably further comprise a grease channel 82 opening onto the upper jaw 14 and a grease fitting 84 for delivering grease to the grease channel 82 for lubricating the engagement between the first guide 66 and the upper jaw 14. The upper jaw 14 preferably has a pocket 86 in the first mounting plate 26 for receiving the first guide 66.

In the preferred embodiment, the second blade stabilizer 42 is located forwardly of the pivot means 16. FIGS. 2 and 6 show the details of the second blade stabilizer 42. Most preferably, the second blade stabilizer 42 comprises a second guide 90 engaging the upper jaw 14, means 70 for attaching the second guide 90 to the second mounting plate 28, and a shim 76 for adjusting the clearance between the second guide 90 and the upper jaw 14. The means 70 may most preferably be threaded bolts 72 with washers 73, but it will be recognized that any equivalent fasteners such as screws or pins could also be used. Threaded bolts 70 preferably engage the second mounting plate 28 through recessed apertures 74. The second blade stabilizer 42 may optionally further comprise an adjustment plate 80 between the second mounting plate 28 and the shim 76. The second guide 90 may preferably further comprise a grease channel 82 opening onto the upper jaw 14 and a grease fitting 84 for delivering grease to the grease channel 82 for lubricating the engagement between the second guide 90 and the upper jaw 14. The upper jaw 14 preferably has a pocket 92 in the second mounting plate 28 for receiving the second guide 90.

Figure 3:
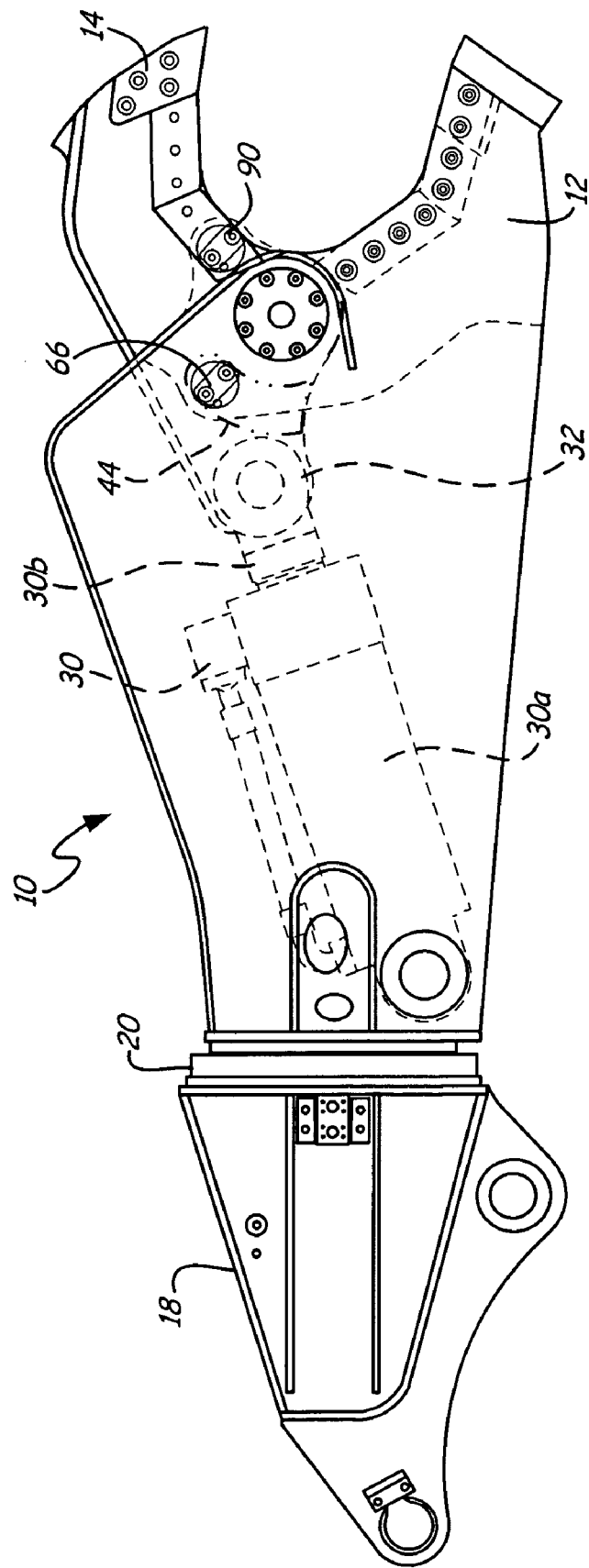
FIG. 3 is a right-side elevational view of the heavy-duty demolition apparatus of the present invention with some internal structure shown in phantom.
Figure 3A:
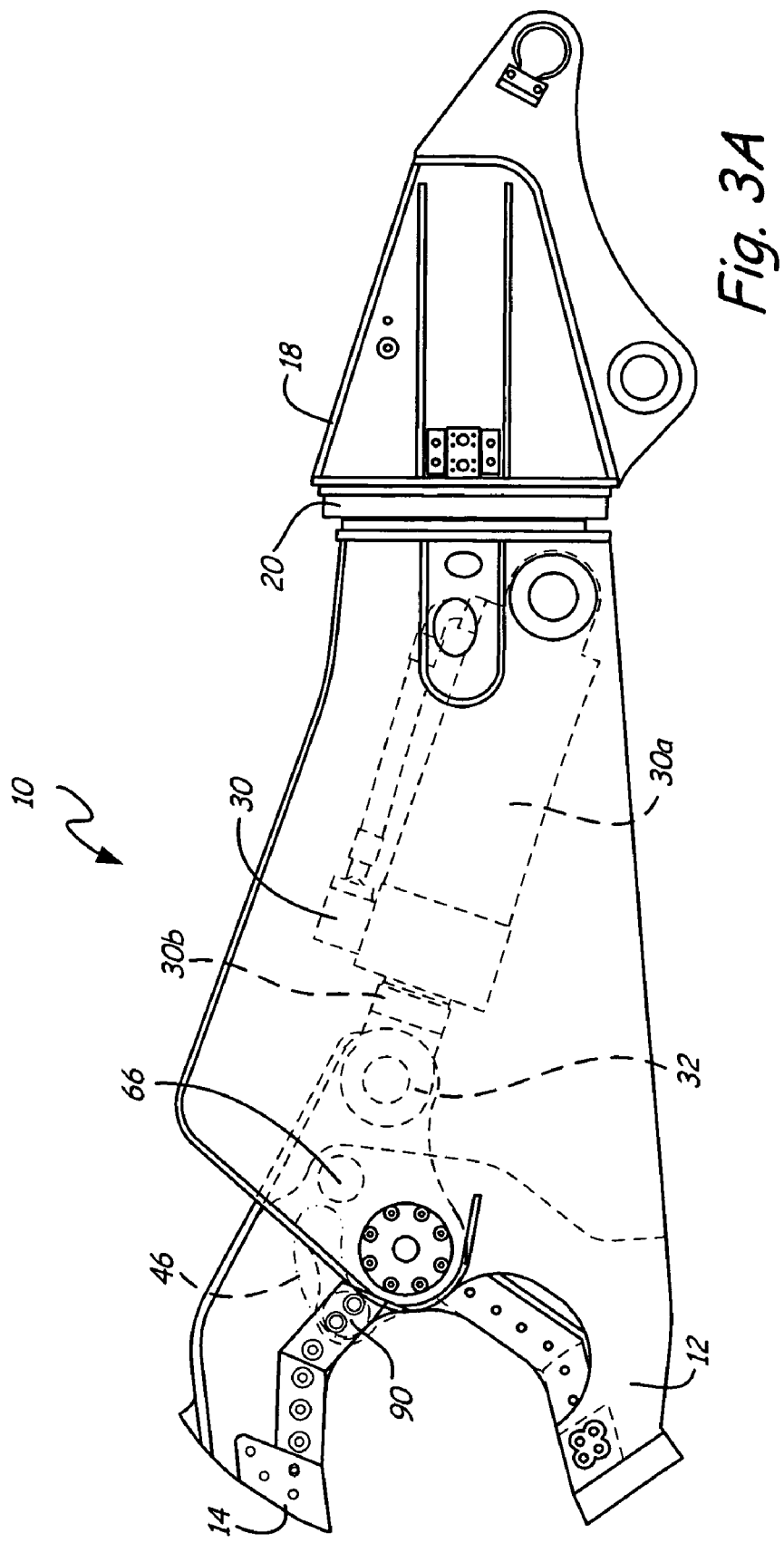
FIG. 3A is a left side elevational view of the apparatus.
Figure 4:
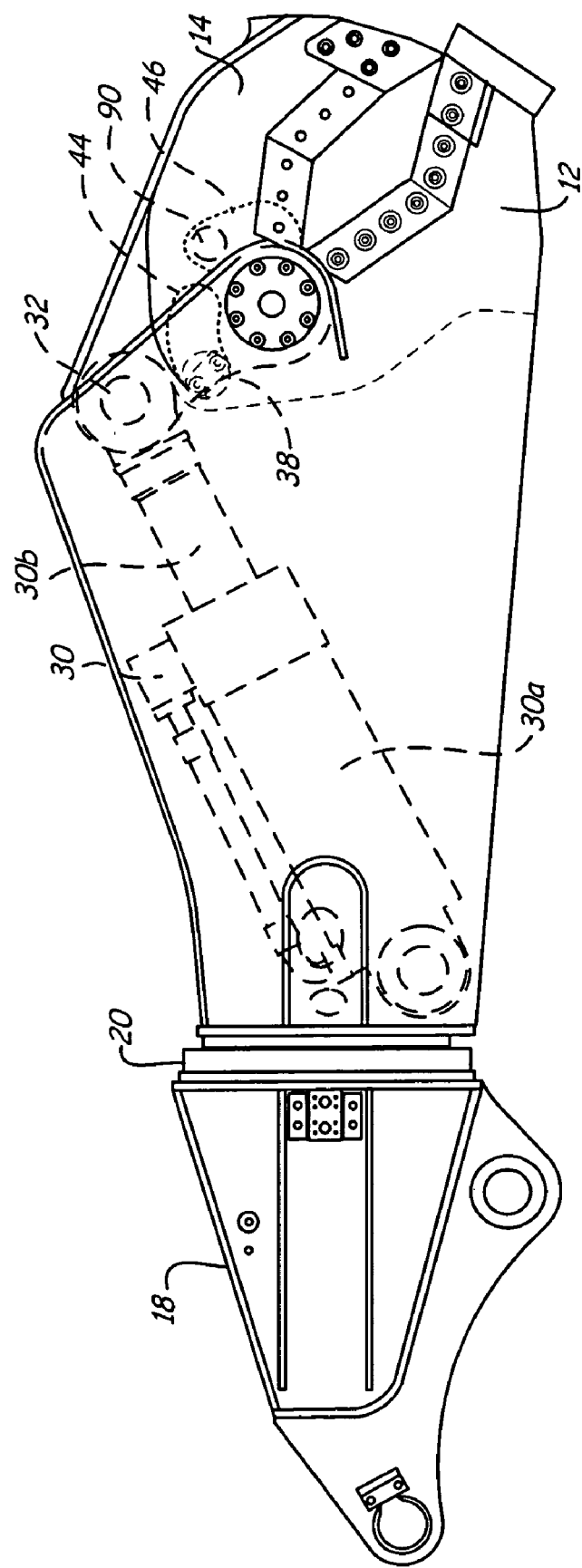
FIG. 4 is the same as FIG. 3, showing the upper jaw partially closed.
Figure 5:
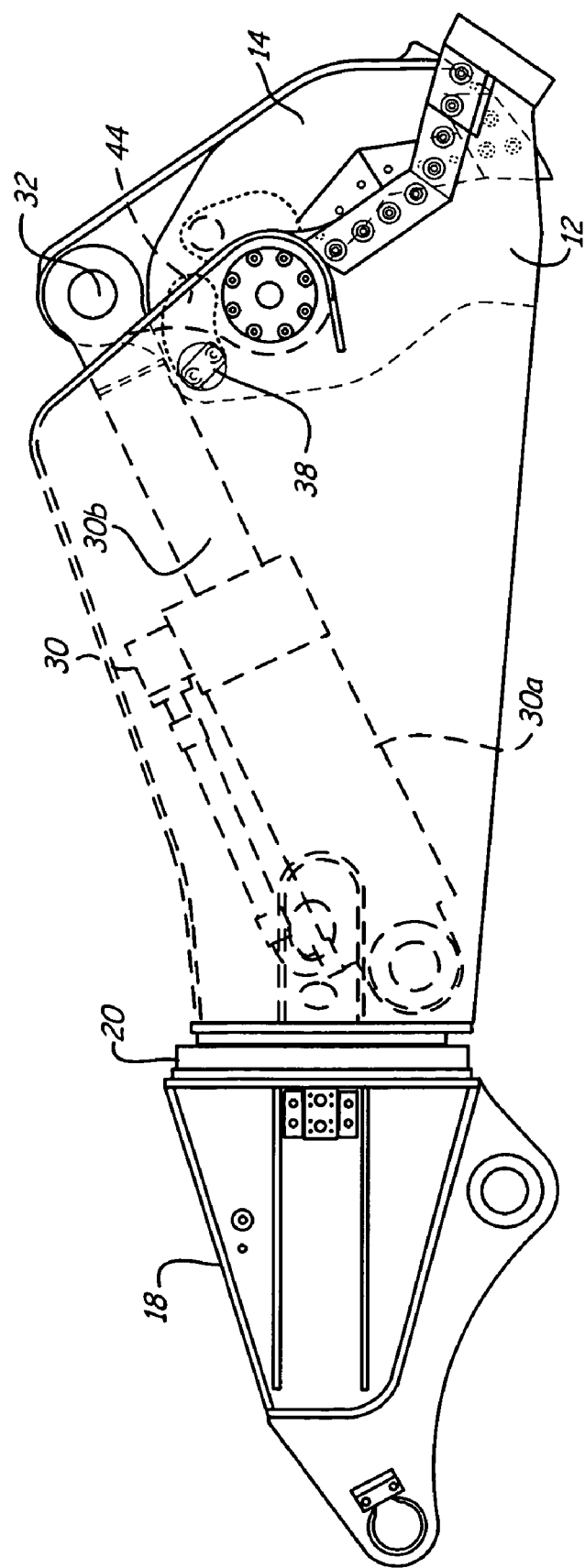
FIG. 5 is the same as FIG. 3, showing the upper jaw fully closed.

Operation of the present invention may best be seen by viewing FIGS. 3–5. In FIG. 3, the upper jaw 14 is in the open position, preparatory to shearing the workpiece. It will be seen that the guide or pad or guide pad 66 rests at one end of the first arcuate wear surface 44 and the second guide or pad or guide pad 90 rests at one end of the second arcuate wear surface 46. In FIG. 4, the upper jaw has partially closed on the workpiece (not shown) and has begun to shear the workpiece. The guides 66, 90 are still supported by the wear surfaces 44, 46 respectively. In FIG. 5, the upper shear blade has been entirely received in the slot 58. Consequently, the support of the guide pads 66, 90 is no longer required and the guide pad 66 has moved off the first arcuate wear surface 44. Although not shown in the Figure, the second arcuate wear surface could also be dimensioned so that the guide pad 90 has moved off it at this point.

Before beginning operation, the operator uses a feeler gauge or a shim to measure the clearance (typically 0.003 to 0.010 inches) between the guides 66 and 90 wear surfaces 44 and 46 respectively. If the measurement is within the range of 0.003 to 0.010 inches, no adjustments are needed. If the measurement is below this range, shims 76 or 72 are either removed entirely or replaced with thinner shims to bring the arrangement within operating tolerances of 0.003 to 0.010 inches. After the pucks or guides 66 or 90 wear and the clearance is larger than 0.010 of an inch, and appropriate shim size is determined. The upper jaw 14 is then closed, the threaded bolts 70 are loosened, the shims 76 are inserted, and the bolts 70 are re-tightened. Unlike previous designs, the guides 66, 90 are very durable with fewer maintenance problems. The clearance between the upper jaw 14 and the guides 66, 90 may be adjusted as the guides 66, 90 wear by adding additional shims. The grease fitting allows the engagement between the guides 66, 90 and the upper jaw to be lubricated, reducing wear. As no fasteners traverse the mounting plates 26, 28 in this design, it is unlikely that the mechanism will seize, which previously required cutting out the damaged assembly and welding in a new assembly. Also, the simpler design reduces manufacturing costs. The adjustment plates 80 can be used to adjust for manufacturing variances and customized to each apparatus, but are not required for all applications.

Unless otherwise defined, all technical and scientific terms used herein have the same meaning as commonly understood by one of ordinary skill in the art to which this invention belongs. Although methods and materials similar to or equivalent to those described herein can be used in the practice or testing of the present invention, suitable methods and materials are described below. All publications, patent applications, patents, and other references mentioned herein are incorporated by reference in their entirety to the extent allowed by applicable law and regulations. In case of conflict, the present specification, including definitions, will control.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed:

1. A heavy-duty demolition apparatus for attachment to the boom structure and hydraulic system of an excavator, the apparatus having a blade-stabilizing device, the apparatus having a forward end and a rearward end, the apparatus comprising:
   (a) a lower jaw and an upper jaw and pivot means interconnecting the jaws together, means for attachment to the boom structure of the excavator, the upper jaw having a first side and a second side, the lower jaw having a first mounting plate adjacent the first side and a second mounting plate adjacent the second side, the first and second mounting plates receiving the pivot means therebetween, and the upper jaw having means for attachment to the hydraulic system of the excavator for closing and opening the upper jaw relative to the lower jaw; the lower jaw and the upper jaw shearing a workpiece when the upper jaw is closed upon the lower jaw; and
   (b) a blade stabilizing device engaging the upper jaw to prevent the upper jaw from moving laterally with respect to the lower jaw and for reducing lateral stress on the upper jaw while shearing the workpiece, wherein the blade stabilizing device further comprises a first blade stabilizer attached to the first mounting plate and slidably engaging the upper jaw on the first side of the upper jaw, the first blade stabilizer further comprising a guide engaging the upper jaw, means for attaching the guide to the first mounting plate, and a shim for adjusting the clearance between the guide and the upper jaw.

2. The apparatus of claim 1, further comprising an adjustment plate between the shim and the first mounting plate.

3. The apparatus of claim 1, wherein the means for attaching the guide to the first mounting plate comprises threaded bolts.

4. The apparatus of claim 1, wherein the guide has a grease channel opening onto the upper jaw and a grease fitting for delivering grease to the grease channel for lubricating the engagement between the guide and the upper jaw.

5. The apparatus of claim 1, wherein the upper jaw further comprises a pocket receiving the guide therein.

6. The apparatus of claim 1, further comprising a second blade stabilizer attached to the second mounting plate and slidably engaging the upper jaw on the second side of the upper jaw, the second blade stabilizer further comprising a second guide engaging the upper jaw, means for attaching the second guide to the second mounting plate, and a shim for adjusting the clearance between the second guide and the upper jaw.

7. The apparatus of claim 6, wherein the first blade stabilizer is mounted rearwardly of the pivot means and the second blade stabilizer is mounted forwardly of the pivot means.

8. The apparatus of claim 6, further comprising an adjustment plate between the shim and the second mounting plate.

9. The apparatus of claim 6, wherein the means for attaching the second guide to the second mounting plate comprises threaded bolts.

10. The apparatus of claim 6, wherein the second guide has a grease channel opening onto the upper jaw and a grease fitting for delivering grease to the grease channel for lubricating the engagement between the second guide and the upper jaw.

11. The apparatus of claim 6, wherein the upper jaw further comprises a second pocket receiving the second guide therein.

12. A heavy-duty demolition apparatus for attachment to the boom structure and hydraulic system of an excavator, the apparatus having a blade-stabilizing device, the apparatus having a forward end and a rearward end, the apparatus comprising:
  (a) a lower jaw and an upper jaw and pivot means interconnecting the jaws together, means for attachment to the boom structure of the excavator, the upper jaw having a first side and a second side, the lower jaw having a first mounting plate adjacent the first side and a second mounting plate adjacent the second side, the first and second mounting plates receiving the pivot means therebetween, and the upper jaw having means for attachment to the hydraulic system of the excavator for closing and opening the upper jaw relative to the lower jaw; the lower jaw and the upper jaw shearing a workpiece when the upper jaw is closed upon the lower jaw; and
  (b) a blade stabilizing device engaging the upper jaw to prevent the upper jaw from moving laterally with respect to the lower jaw and for reducing lateral stress on the upper jaw while shearing the workpiece, wherein the blade stabilizing device further comprises a first blade stabilizer attached to the first mounting plate and slidably engaging the upper jaw on the first side of the upper jaw, the first blade stabilizer further comprising a guide engaging the upper jaw, means for attaching the guide to the first mounting plate, and a shim for adjusting the clearance between the guide and the upper jaw, and wherein the blade stabilizing device further comprises a second blade stabilizer attached to the second mounting plate and slidably engaging the upper jaw on the second side of the upper jaw, the second blade stabilizer further comprising a second guide engaging the upper jaw, means for attaching the second guide to the second mounting plate, and a shim for adjusting the clearance between the second guide and the upper jaw.

13. The apparatus of claim 12, further comprising an adjustment plate between the shim and the first mounting plate and between the shim and the second mounting plate.

14. The apparatus of claim 12, wherein the means for attaching the guides to the first mounting plate and second mounting plate comprises threaded bolts.

15. The apparatus of claim 12, wherein the guides have a grease channel opening onto the upper jaw and a grease fitting for delivering grease to the grease channel for lubricating the engagement between the guides and the upper jaw.

16. The apparatus of claim 12, wherein the upper jaw further comprises pockets receiving the guides therein.

17. The apparatus of claim 12, wherein the first blade stabilizer is mounted rearwardly of the pivot means and the second blade stabilizer is mounted forwardly of the pivot means.

* * * * *